United States Patent [19]
Puetz

[11] Patent Number: 5,897,598
[45] Date of Patent: Apr. 27, 1999

[54] METHOD FOR OPERATING AN ANTI-THEFT SYSTEM FOR A MOTOR VEHICLE AND ANTI-THEFT SYSTEM FOR PERFORMING THE METHOD

[75] Inventor: Andreas Puetz, Kuerten, Germany

[73] Assignee: Siemens Aktiengesellschaft, Munich, Germany

[21] Appl. No.: 08/647,036

[22] Filed: May 9, 1996

[30] Foreign Application Priority Data

May 9, 1995 [DE] Germany ............................ 195 16 992

[51] Int. Cl.⁶ ................................ H04L 9/32; B60R 25/04
[52] U.S. Cl. ................................ 701/35; 701/32; 701/34; 307/10.2; 307/10.6; 340/426; 340/825.34; 340/825.5
[58] Field of Search ..................... 701/1, 32, 34, 701/35; 307/10.1, 10.2, 10.3, 10.5, 10.6; 180/287; 340/25.5, 426, 825.31, 825.34, 825.5, 825.52, 825.69, 825.72, 825.83; 361/171, 127

[56] References Cited

U.S. PATENT DOCUMENTS

| | | | |
|---|---|---|---|
| 4,392,133 | 7/1983 | Lundgren | 340/825.31 |
| 4,509,093 | 4/1985 | Stellberger | 361/172 |
| 4,712,177 | 12/1987 | Schrenk | 364/247 |
| 4,847,614 | 7/1989 | Keller | 340/825.56 |
| 4,990,906 | 2/1991 | Kell et al. | 340/825.31 |
| 5,473,200 | 12/1995 | Woo | 307/10.2 |
| 5,552,641 | 9/1996 | Fischer et al. | 307/10.5 |
| 5,563,600 | 10/1996 | Miyake | 341/173 |
| 5,600,723 | 2/1997 | Woodall et al. | 340/825.31 |
| 5,619,191 | 4/1997 | Lambropoulos et al. | 340/825.69 |

FOREIGN PATENT DOCUMENTS 4308899  2/1994  Germany .

*Primary Examiner*—Tan Q. Nguyen
*Attorney, Agent, or Firm*—Herbert L. Lerner; Laurence A. Greenberg

[57] ABSTRACT

A portable transponder, such as key, first sends invalid data to a lock, whereupon a challenge signal with a memory address is transmitted back to the transponder. A code word stored in memory at the memory address in the transponder is read out and transmitted to the lock. There, the code word is compared with a desired code word. If they correspond, an immobilizer is released. Next, the address and/or code word is recalculated in the lock and adjusted in the transponder for the next release cycle. An alternating code is thus created.

10 Claims, 3 Drawing Sheets

FIG.2a
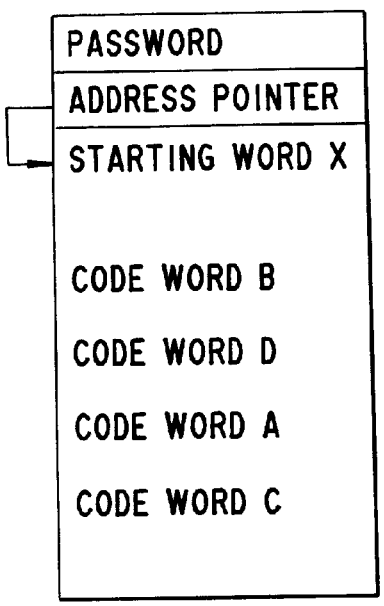
FIG.2b
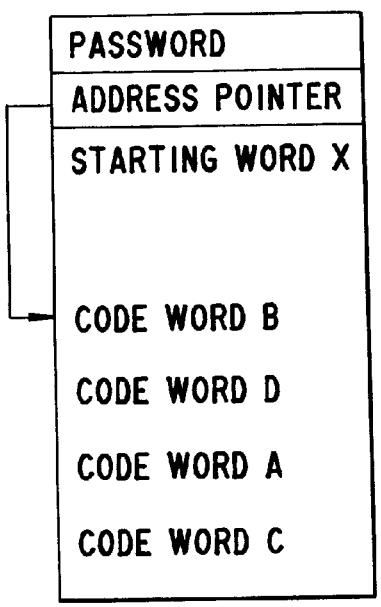
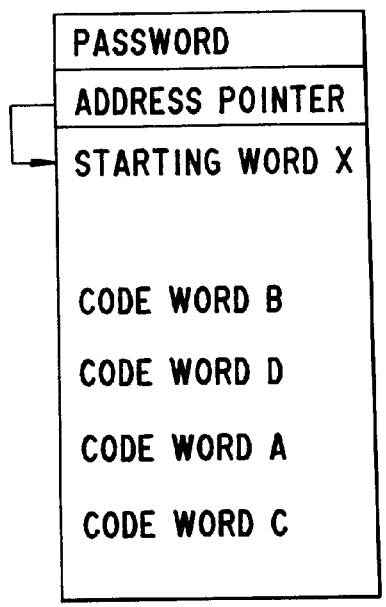
FIG.2c

5,897,598

METHOD FOR OPERATING AN ANTI-THEFT SYSTEM FOR A MOTOR VEHICLE AND ANTI-THEFT SYSTEM FOR PERFORMING THE METHOD

BACKGROUND OF THE INVENTION

Field of the Invention

The invention relates to a method for operating an anti-theft system for a motor vehicle, and to an anti-theft system, in particular an immobilizer.

In a known anti-theft system (German Patent DE 43 08 899 C1), a three-stage dialog takes place between a key and a lock. First, the key transmits a first code signal, which is modulated into a second code signal in the lock with the aid of a computer. The second code signal is received by the key, which in turn, with the aid of an arithmetic unit, generates a third code signal that is transmitted back to the lock. In the lock, the third code signal is compared with a desired code signal, and upon correspondence a release signal is generated.

In that anti-theft system, an arithmetic unit is necessary in the key. It is only in that way that a code which changes constantly can be generated.

SUMMARY OF THE INVENTION

It is accordingly an object of the invention to provide a method for operating an anti-theft system for a motor vehicle and an anti-theft system for performing the method, which overcome the hereinafore-mentioned disadvantages of the heretofore-known methods and devices of this general type and in which there is no arithmetic unit in a key yet nevertheless upon each transmission between the key and a lock, a changed code signal is transmitted in each release operation.

With the foregoing and other objects in view there is provided, in accordance with the invention, a method for operating an anti-theft system for a motor vehicle, which comprises transmitting a starting signal from a key; receiving the starting signal at a lock, causing the lock to generate and transmit an encoded challenge signal back to the key; checking the challenge signal for authorization with the key, and upon authorization, extracting a code signal from a memory and transmitting the code signal to the lock as a function of contents of the challenge signal; and comparing the code signal in the lock with an expected desired code signal, and releasing a security system if the signals correspond.

With the objects of the invention view there is also provided, in accordance with the invention, an anti-theft system for a motor vehicle, comprising a security unit; a key for transmitting a starting signal; and a lock for receiving the starting signal; the lock having an arithmetic unit for generating an encoded challenge signal to be transmitted back to the key after the starting signal is received; the key receiving and checking the challenge signal for authorization; the key having a memory with addresses at which code signals are stored for extraction upon authorization as a function of contents of the challenge signal and for transmission to the lock; and the lock having a comparison unit connected to the arithmetic unit for comparing the received code signal with a stored desired code signal and transmitting a release signal to the security unit if the signals correspond.

As soon as a key has transmitted a starting signal, a challenge signal is generated in the lock, as a result of which the key extracts a code signal from its memory and transmits it to the lock. In the lock, a comparison with a desired code signal takes place. Upon correspondence of the signals, a release signal is generated. In the key, the code signal is not calculated, but instead the lock specifies the address at which the code signal can be found in the key memory. After each release operation, the address and thus the code signal are changed.

In accordance with another mode of the invention, there is provided a method which comprises storing one code signal at each respective address of the challenge signal in the memory of the key, and changing the address from a previously transmitted address each time the challenge signal is transmitted.

In accordance with a further mode of the invention, there is provided a method which comprises presetting an address pointer in the memory of the key to the starting signal, for adjusting the challenge signal to the address for the code signal and readjusting the challenge signal to the starting signal again after the code signal is transmitted.

In accordance with an added mode of the invention, there is provided a method which comprises transmitting a password and a new code signal to the key with the challenge signal, and storing the code signal at an address in the memory of the key if the password corresponds with a desired password.

In accordance with another feature of the invention, the key includes a transponder.

In accordance with a further feature of the invention, the security unit is an immobilizer or a door locking system.

In accordance with an added feature of the invention, the memory is a read-write memory.

In accordance with a concomitant feature of the invention, the arithmetic unit is a microprocessor.

Other features which are considered as characteristic for the invention are set forth in the appended claims.

Although the invention is illustrated and described herein as embodied in a method for operating an anti-theft system for a motor vehicle and an anti-theft system for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 2a–2c are block diagrams of a code signal memory in the key of the first exemplary embodiment.

DESCRIPTION OF THE PREFERRED EMBODIMENTS

Figure 1:
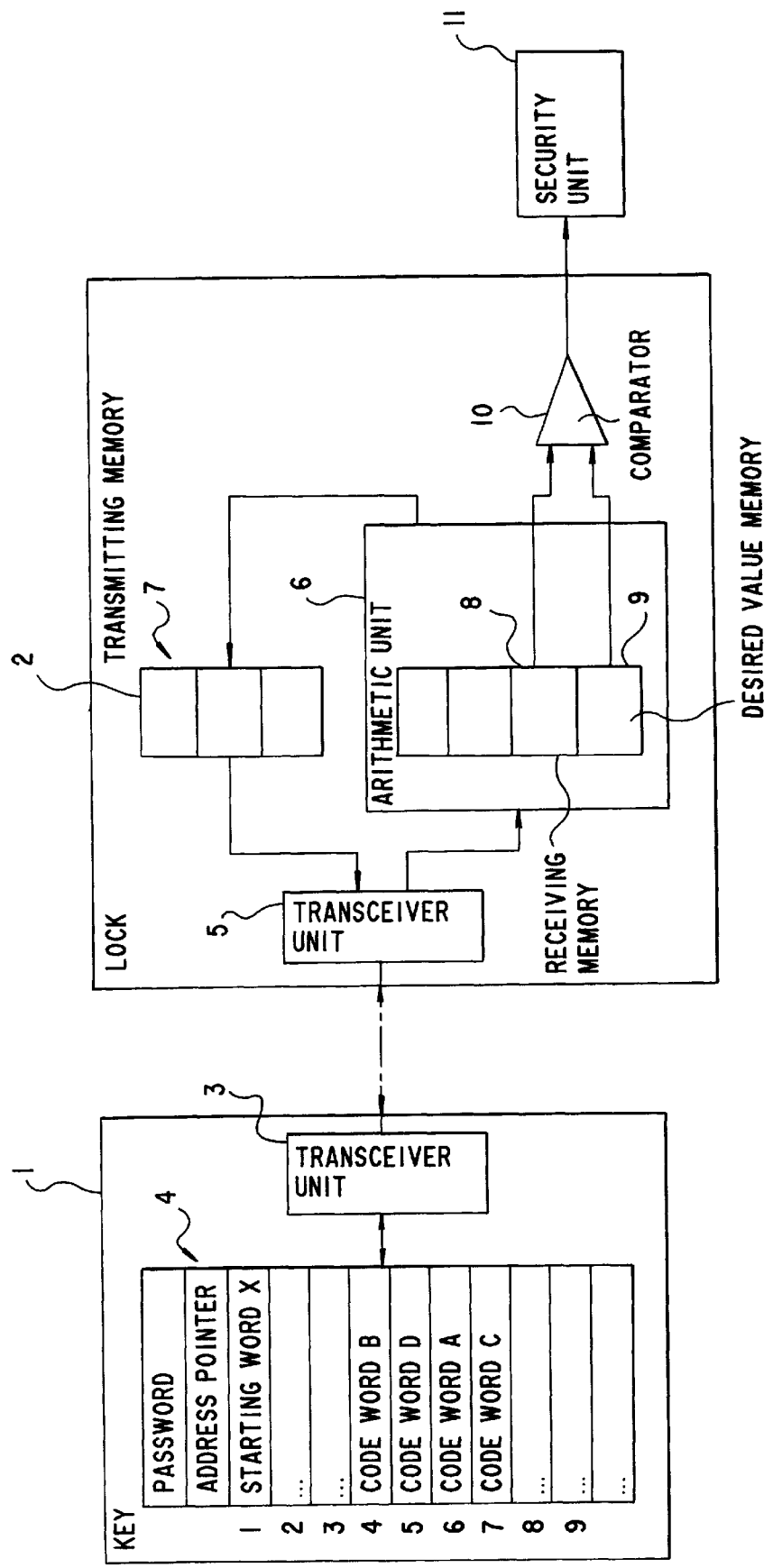
FIG. 1 is a schematic and block circuit diagram of the anti-theft system according to the invention having a key and a lock.

Referring now to the figures of the drawings in detail and first, particularly, to FIG. 1 thereof, there is seen an anti-theft system for a motor vehicle according to the invention which has a portable key 1 that electronically enters into communication with a lock 2 in the motor vehicle. A transceiver unit 3 is disposed in the key 1 for transmitting and receiving signals in wireless fashion (as represented by a double arrow in dot-dash lines in FIG. 1).

The key 1 outputs a signal through the transceiver unit 3, as soon as the key either receives a signal or is supplied electromagnetically with energy through the transceiver unit 3. The key 1 also has a memory 4, in which one code word, for instance a code word a, a code word b, etc., is each stored at a respective address. An address pointer points to the address at which the particular code word that is then transmitted is stored. The memory 4 also includes a memory region for a vehicle-specific/user-specific password.

The key 1 may, for instance, be constructed as an ignition key or a door key. As soon as the ignition key is inserted into the ignition lock, components of the key 1 are supplied with energy. A first signal is thereupon transmitted to the lock 2.

The lock 2 likewise has a transceiver unit 5, which is connected to an arithmetic unit 6 and a transmitting memory 7. The arithmetic unit 6 has a receiving memory 8, into which the received signals are written, and a desired value memory 9, in which the manufacturer or user stores desired values. The receiving memory 8 and the desired value memory 9 are connected to a comparator 10, which upon correspondence of the contents of the two memories 8 and 9 transmits a release signal to a security unit 11, in the motor vehicle.

Such a security unit may, for instance, be a control unit, which performs the function of an immobilizer. Examples of such a control unit are an engine control unit, a valve for turning a supply of fuel on and off, or a switch for turning on an ignition circuit. Through the use of an immobilizer, starting of the engine is possible only upon authorization. Door locking systems for the motor vehicle can also serve as the security unit 11.

The arithmetic unit 6 is connected to the transmitting memory 7, in which vehicle-specific passwords, a memory address and code words are stored. The data of the transmitting memory 7 are transmitted through the transceiver unit 5 to the key 1.

A first exemplary embodiment of the method of the invention for operating an anti-theft system will be described in further detail in conjunction with FIGS. 2a–2c.

In each of the following drawing figures, the memory 4 that has a password memory region and code word memory regions is shown. An address pointer points to one memory region each, such as a starting word x, the code word b, etc., in accordance with an address such as 1, 2, . . . .

First, the address pointer points to the starting word x (FIG. 2a). The address pointer always points to this starting word x when the key 1 is in the state of repose.

As soon as the key 1 is supplied inductively with energy in the lock 2, a starting signal is transmitted that contains the starting word x. However, no release of the security unit is yet possible with the starting signal, since the starting signal merely initiates communication between the key 1 and the lock 2.

The starting signal is received by the lock 2, as a result of which a challenge signal is generated there and transmitted. The challenge signal may include a vehicle-specific password, a memory address, and a code word. Through the use of the challenge signal received from the key 1, the address pointer is aimed at the address contained in the challenge signal, at which address the code word b (FIG. 2b) is stored in memory. Next, this code word b is transmitted to the lock 2 in a code signal. In the lock 2, the received code word b is compared with a desired code word stored at the same address in the desired word memory 9. Upon correspondence of the two code words, the release signal is generated and transmitted to a security unit in the motor vehicle. If there is no correspondence, an alarm can be tripped.

Subsequently, a signal which contains the password stored in the transmitting memory 7 is again transmitted to the key 1. If the transmitted password corresponds with the password stored in the memory 4, the address pointer can be reset to point at the starting word x. This thus concludes one release cycle, and the key 1 is in the state of repose.

If the key 1 should then be activated without authorization, it transmits only the starting word x. However, no release of the immobilizer is possible with this starting word x. This can be done only through the use of a valid code word, such as the code word b.

In the next release cycle, the address pointer is adjusted, as a function of the address being received, to a different code word, such as the code word a or c. Specifically, the new address is generated in the lock 2 through the use of a random generator or a mathematical algorithm and transmitted to the key 1. This accordingly creates a so-called changing code, in which upon each release cycle, a code word differing from the preceding code word is transmitted. It is only after a certain number of release cycles that the code word again repeats. If the memories 4, 7 and 8 have a very great memory capacity, then great code versatility is achieved. It is then of no use to the thief if he or she overhears the code signal, because upon the next release cycle a different code signal brings about the release.

Figure 3A:
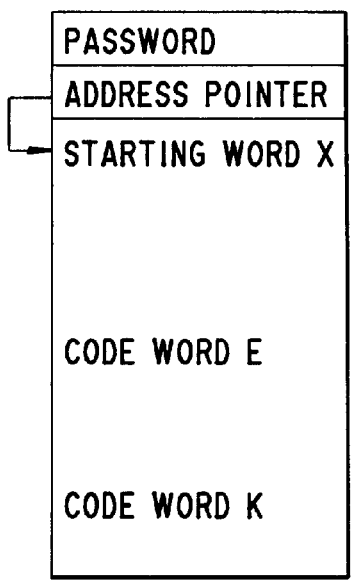
FIGS. 3a–3d are block diagrams of a code signal memory in the key of a further exemplary embodiment.
Figure 3B:
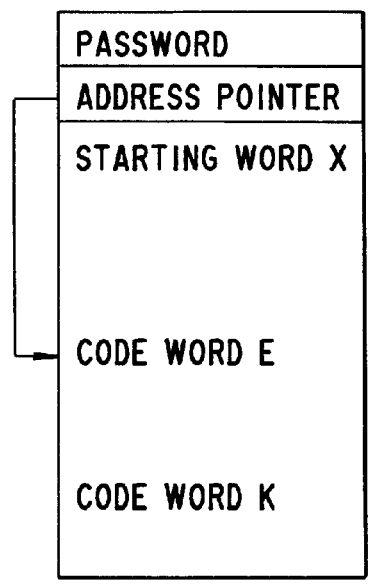
Figure 3C:
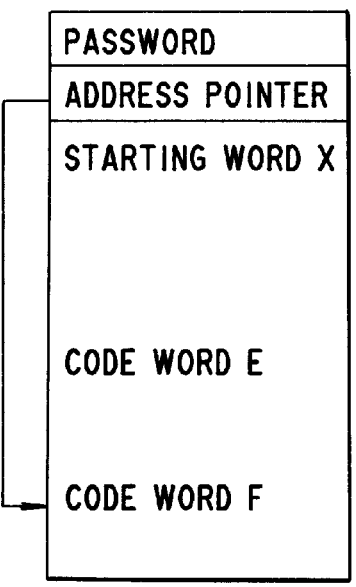

A further exemplary embodiment will be described in further detail in conjunction with FIGS. 3a–3c. First, the address pointer points at invalid data, that is the starting word x, with which release of the security unit is not possible (FIG. 3a).

As soon as the key 1 is supplied with energy, the starting word is transmitted. The challenge signal, which includes a password, is thereupon generated in the lock 2. Upon correspondence of the password with the password stored in memory in the key 1, the address pointer is shifted, as a consequence of the challenge signal, to the code word e (FIG. 3b). This code word e has been imparted to the key 1 by a preceding release cycle.

The key 1 thereupon transmits a code signal that contains this code word e. Upon correspondence of this code word e with a code word stored at the same address in the desired value memory 9, the release signal is generated.

Next, with the aid of the password, a new code word is written into the memory 4 of the key 1. To that end, a new random code word is generated together with an address in the arithmetic unit 6 and buffer-stored in the transmitting memory 7. The code word and the address are transmitted together with the password to the key 1. It is only upon correspondence of the transmitted password with the password memorized in the key 1 that the address pointer is shifted in accordance with the address being received, and the new code word (code word f is overwritten with the code word k) is stored in memory at that address (FIG. 3c).

Thus the key 1 is informed that upon the next release cycle, this code word k must be transmitted. Thus the lock 2 also knows that the desired code word stored at this address in the desired value memory 9 should be compared with the received code word in the next release cycle.

Figure 3D:
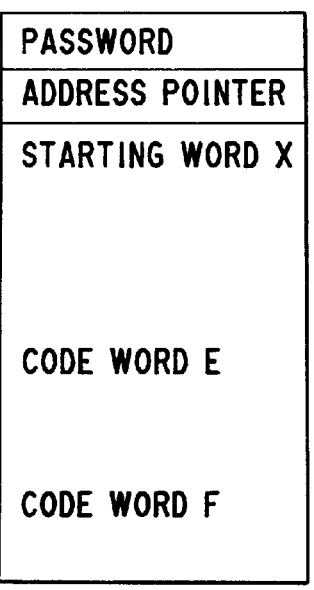

The address pointer is then reset to the starting word x again (FIG. 3d), and a release cycle is concluded. As soon as the key 1 is thereupon activated without authorization, it transmits only the invalid starting word x, with which release of the security unit is not possible. Eavesdropping of the starting signal on the part of unauthorized persons is therefore in vain.

In the next release cycle, the code word f stored at the defined address is then transmitted. The code word f is expected by the lock 2 and is compared there with whichever code word is stored at the same address in the desired value memory 9.

Next, the code word for the next release cycle after that is defined. Since the addresses and code words are always newly generated with the aid of a mathematical algorithm or by a random generator in the arithmetic unit 7, the result is a changing code in which the code words change upon each release cycle. The more complicated the algorithm or the more complicated the structure of the random generator, the more versatile the addresses/code words and therefore the changing code.

With this anti-theft system according to the invention, only a single arithmetic unit 6 in the lock 2 is needed, through the use of which the changing code is generated. A microprocessor, a functionally identical, customer-specific integrated circuit (ASIC) can be used as the arithmetic unit 6. In the key 1, a writable or programmable memory, such as an EEPROM or a RAM, suffices as the memory 4. In the memory 4, one code word each is stored at specified addresses and is then called up whenever the address pointer points at it, in accordance with the address. An already existing code word can also be replaced, that is overwritten, by a code word transmitted from the lock 2.

The signals are transmitted inductively between the key 1 and the lock 2. To that end, the two transceiver units have coils that cooperate in transformer fashion, that is inductively, if the two coils are disposed in the immediate vicinity of one another.

The "key" has both the transceiver unit and the memory 4. The key may also be referred to as a transponder. The key 1 can be carried by a user. An electronic communication with the lock 2 takes place with the aid of the key 1. The key 1 may be constructed in the form of a mechanical key 1 or as a chip card.

The lock 2 has the transceiver unit, the arithmetic unit 6, and the transmitting memory. A control unit in the motor vehicle, which receives the signals from the key 1, processes them, and generates the release signal, can also be understood as the lock 2.

The terms "code word" or "password" are understood to be encoded digital signals, which have a length of 16 bytes, for example.

The address pointer causes a data region for the memory 4, which is determined by the address, to be read out and transmitted. The data and associated addresses are identical, both in the memory 4 of the key 1 and in the desired value memory 9. If data belonging to addresses are changed in the lock 2, then they are also changed by data transmission in the key 1.

I claim:

1. A method for operating an anti-theft system for a motor vehicle, which comprises:

transmitting a starting signal from a key having a memory with an associated address;

receiving the starting signal at a lock having a desired value memory, causing the lock to generate an encoded challenge signal containing at least one address under which a code signal is stored in the memory of the key and in the desired value memory, and transmitting the encoded challenge signal back to the key;

checking the challenge signal for authorization with the key, and upon authorization, accessing the associated address of the memory of the key in dependence of the address in the challenge signal, extracting a code signal from the memory of the key and transmitting the code signal to the lock; and comparing the code signal in the lock with an expected desired code signal stored under the same address in the desired value memory, and releasing a security system if the signals correspond.

2. The method according to claim 1, which comprises storing one code signal at each respective address of the challenge signal in the memory of the key, and changing the address from a previously transmitted address each time the challenge signal is transmitted.

3. The method according to claim 1, which comprises presetting an address pointer in the memory of the key to the starting signal, for adjusting the challenge signal to the address for the code signal and readjusting the challenge signal to the starting signal again after the code signal is transmitted.

4. The method according to claim 1, which comprises transmitting a password and a new code signal to the key with the challenge signal, and storing the code signal at an address in the memory of the key if the password corresponds with a desired password.

5. An anti-theft system for a motor vehicle, comprising:

a security unit;

a key for transmitting a starting signal; and a lock for receiving the starting signal;

said lock having an arithmetic unit for generating an encoded challenge signal to be transmitted back to said key after the starting signal is received;

said key receiving and checking the challenge signal for authorization;

said key having a memory with addresses at which code signals are stored for extraction upon authorization as a function of contents of the challenge signal and for transmission to said lock; and said lock having a comparison unit connected to said arithmetic unit for comparing the received code signal with a stored desired code signal and transmitting a release signal to said security unit if the signals correspond.

6. The anti-theft system according to claim 5, wherein said key includes a transponder.

7. The anti-theft system according to claim 5, wherein said security unit is an immobilizer.

8. The anti-theft system according to claim 5, wherein said security unit is a door locking system.

9. The anti-theft system according to claim 5, wherein said memory is a read-write memory.

10. The anti-theft system according to claim 5, wherein said arithmetic unit is a microprocessor.

* * * * *